US008919915B2

(12) United States Patent
Nystrom et al.

(10) Patent No.: US 8,919,915 B2
(45) Date of Patent: Dec. 30, 2014

(54) ULTRASONIC LAMINATING OF MATERIALS FOR INK JET PRINTHEADS

(75) Inventors: Peter J. Nystrom, Webster, NY (US); Mark A. Cellura, Webster, NY (US); Bijoyraj Sahu, Gainesville, FL (US)

(73) Assignee: Xerox Corporation, Norwalk, CT (US)

( * ) Notice: Subject to any disclaimer, the term of this patent is extended or adjusted under 35 U.S.C. 154(b) by 345 days.

(21) Appl. No.: 13/401,178

(22) Filed: Feb. 21, 2012

(65) Prior Publication Data

US 2013/0215186 A1 Aug. 22, 2013

(51) Int. Cl.
*B41J 2/01* (2006.01)

(52) U.S. Cl.
USPC .......................................................... 347/20

(58) Field of Classification Search
USPC .......................................................... 347/20
See application file for complete search history.

(56) References Cited

U.S. PATENT DOCUMENTS

2008/0072423 A1* 3/2008 Finn ................................. 29/854
2011/0141204 A1* 6/2011 Dolan et al. ..................... 347/71

OTHER PUBLICATIONS

Ultrasonic bonding for MEMS sealing and packaging, Kim et al., IEEE Transactions on Advanced Packaging, vol. 32, No. 2, 2009.
Adhesion Enhancement and Lamination of Polyimide Films, Stoffel et al., IEEE Transactions on Components, Packaging and Manufacturing Technology, vol. 19, No. 2, 1996.

* cited by examiner

*Primary Examiner* — Laura Martin
(74) *Attorney, Agent, or Firm* — MH2 Technology Law Group LLP

(57) ABSTRACT

A method for assembling a printhead such as an ink jet printhead can include the use of an ultrasonic bonding process to bond two or more printhead layers together. In an embodiment, an ultrasonic frequency is directed to an interface between a first layer and a second layer to generate heat at the interface. In an embodiment, the heat melts at least one of the first layer and the second layer, and the layers are cooled to cure the melted layer. In another embodiment, the heat generated using the ultrasonic frequency cures an adhesive layer between the first layer and the second layer. The ultrasonic lamination process described can result in a fluid-tight seal which requires less processing time and materials over an adhesive-based process.

7 Claims, 3 Drawing Sheets

ULTRASONIC LAMINATING OF MATERIALS FOR INK JET PRINTHEADS

FIELD OF THE EMBODIMENTS

The present teachings relate to the field of printing devices, and more particularly to printing devices including printheads such as ink jet printheads.

BACKGROUND OF THE EMBODIMENTS

Printing an image onto a print medium such as paper for consumer and industrial use is dominated generally by laser technology and ink jet technology. Ink jet technology has become more common as ink jet printing resolution and print quality have increased. Ink jet printers typically use either thermal ink jet technology or piezoelectric technology. Even though they are more expensive to manufacture than thermal ink jets, piezoelectric ink jets are generally favored, for example, because they can use a wider variety of inks.

Piezoelectric ink jet printheads typically include a flexible diaphragm manufactured from, for example, stainless steel. Piezoelectric ink jet printheads can also include an array of piezoelectric transducers (i.e., actuators) attached to the diaphragm. Other printhead structures can include one or more laser-patterned dielectric standoff layers and a flexible printed circuit (flex circuit) or printed circuit board (PCB) electrically coupled with each transducer. A printhead can further include a body plate, an inlet/outlet plate, and an aperture plate, each of which can be manufactured from stainless steel. The aperture plate includes a plurality of nozzles (i.e., one or more openings, apertures, or jets) through which ink is dispensed during printing.

During use of a piezoelectric printhead, a voltage is applied to a piezoelectric transducer, typically through electrical connection with a flex circuit electrode electrically coupled to a voltage source, which causes the piezoelectric transducer to bend or deflect, resulting in a flexing of the diaphragm. Diaphragm flexing by the piezoelectric transducer increases pressure within an ink chamber and expels a quantity of ink from the chamber through a particular nozzle in the aperture plate. As the diaphragm returns to its relaxed (unflexed) position, it reduces pressure within the chamber and draws ink into the chamber from a main ink reservoir through an opening to replace the expelled ink.

The complex three-dimensional microfluidic channels (ink ports) for ink jet printheads can be fabricated by assembling a plurality of layers which can include a number of different materials such as one or more laser patterned polymers, etched stainless steel layers, and aluminum layers. The manufacturing process can include stacking the layers within a press and applying high pressure and temperature. A plurality of adhesive films are used to effect bonding of the material layers together. An adhesive cure cycle can require the application of the pressure and temperature on the layer stack within the press for an extended duration of time, for example two hours, to minimize delamination of the layers and premature failure of the printhead during use. The adhesives which bond the various printhead layers together are formulated for both their bonding reliability and their compatibility with solid and ultraviolet inks.

SUMMARY OF THE EMBODIMENTS

The following presents a simplified summary in order to provide a basic understanding of some aspects of one or more embodiments of the present teachings. This summary is not an extensive overview, nor is it intended to identify key or critical elements of the present teachings nor to delineate the scope of the disclosure. Rather, its primary purpose is merely to present one or more concepts in simplified form as a prelude to the detailed description presented later.

An embodiment of a method for forming a printer subassembly can include forming an ink jet printhead using a method comprising placing a first layer in contact with a second layer, using an ultrasonic horn to exert pressure against the second layer to hold the second layer against the first layer at an interface between the first layer and the second layer, applying an ultrasonic frequency at the interface between the first layer and the second layer with the ultrasonic horn, and curing at least one of the first layer and the second layer to physically attach the first layer to the second layer.

An embodiment of a printer subassembly can include an ink jet printhead, wherein the ink jet printhead has a first layer, a second layer, and an ultrasonically bonded layer which physically contacts the first layer and the second layer and physically connects the first layer to the second layer.

An embodiment of a printer can include an ink jet printhead having a first layer, a second layer, and an ultrasonically bonded layer which physically contacts the first layer and the second layer and physically connects the first layer to the second layer. The printer can further include a housing which encloses the ink jet printhead.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figure 1:
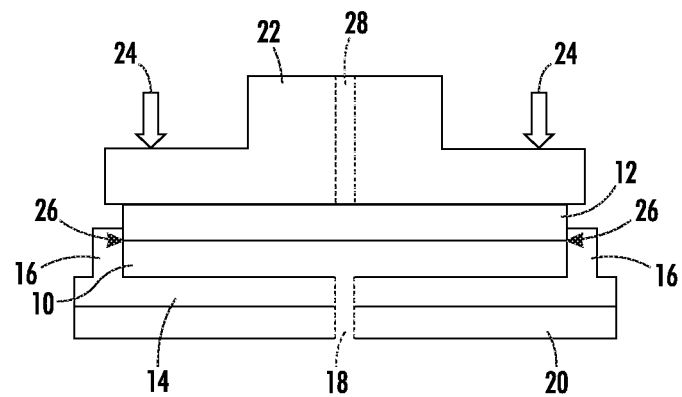
FIG. 1 is a cross section depicting ultrasonic bonding of two layers in accordance with an embodiment of the present teachings.

It should be noted that some details of the FIGS. have been simplified and are drawn to facilitate understanding of the present teachings rather than to maintain strict structural accuracy, detail, and scale.

DESCRIPTION OF THE EMBODIMENTS

Reference will now be made in detail to the exemplary embodiments of the present teachings, examples of which are illustrated in the accompanying drawings. Wherever possible, the same reference numbers will be used throughout the drawings to refer to the same or like parts.

As used herein unless otherwise specified, the word "printer" encompasses any apparatus that performs a print outputting function for any purpose, such as a digital copier, a bookmaking machine, a facsimile machine, a multi-function machine, a plotter, etc.

The word "polymer" encompasses any one of a broad range of carbon-based compounds formed from long-chain molecules including thermosets, thermoplastics, resins such as polycarbonates, epoxies, and related compounds known to the art.

The term "cured" is used herein to describe a layer which has been altered to provide a completed adhesive layer. A cured layer can be a layer which has been melted and cooled to provide adhesion of the cured layer to another layer. A cured layer can further be a heat-curable adhesive which has been cured by heat.

As discussed above, an assembled stack of ink jet printhead layers can be placed within a heated press to cure conventional adhesives during printhead manufacture. Relatively long processing times are needed to cure the adhesive, for example two hours or more, at relatively high temperatures and pressures, for example 300° C. and 300 psi. High temperatures required for curing the adhesive can damage other printhead structures such as silicon-based structures, and reduce the thermal budget available for subsequent processing. Additionally, the layer stack can include patterned standoffs which are used to contain the liquid adhesive to ensure that it does not flow away from desired areas which can result in contamination, blocked ink ports, and a malfunctioning printhead. Patterned standoffs can be expensive, require precise placement, and add to the cost of manufacture. Further, the characteristics of two different materials can make their physical connection difficult, such that an adhesive cannot be used to reliably connect the two materials together. Attempts to physically connect the materials with a conventional adhesive can result in delamination of the two materials and failure of the printhead.

Reducing assembly time and the number of materials required to form a printhead can decrease manufacturing costs and process complexity. Further, new ways of connecting two different materials can result in more materials available for printhead formation.

In various embodiments of the present teachings, an ultrasonic bonding process and techniques described below are specifically suited for bonding of multiple stack of inkjet printhead layers. In various embodiments of the present teachings, two or more printhead layers can be physically attached to each other using an ultrasonic bonding process. Use of an embodiment of the present teachings can reduce the number of materials used, for example by eliminating the need for an adhesive layer to physically connect two layers together. In another embodiment, a particular ultrasonically bonded or cured adhesive layer can be interposed between two layers, wherein the two layers are materials which previously were incompatible and could not be physically connected reliably using conventional adhesives. This can include materials such as DuPont™ Teflon® and polyethylene, a polymer to a metal, and other materials which do not lend themselves to traditional adhesive bonding, such as materials having a low surface energy.

FIG. 1 is a cross section depicting an embodiment of the present teachings. In this embodiment, a jet stack including at least a first layer 10 and a second layer 12 can be placed into an ultrasonic bonding fixture or chuck 14. The first layer 10 and second layer 12 are two individual layers targeted to be physically attached to each other through ultrasonic bonding. The bonding fixture 14 can position and align the first layer 10 relative to the second layer 12 during the ultrasonic bonding process. For example, the fixture 14 can include walls 16 which define a recess which receives the first layer 10 and can receive the second layer 12 to align the first and second layers to each other. The size of the recess formed by walls 16 can include a gap between the wall and layer 12 to allow movement of layer 12 during the ultrasonic bonding process, as long as the gap does not result in improper alignment of layer 12 to layer 10. In another embodiment, the walls 16 do not extend above the upper surface of layer 10. For example, in addition to (or instead of) walls 16, the fixture 14 can include one or more channels 18 which can be used to apply a vacuum to the first layer 10. The first layer 10 can be aligned and positioned onto fixture 14, and a vacuum through channel 18 can hold the first layer 10 in position during ultrasonic bonding. The ultrasonic bonding fixture 14 can be located on a base plate 20.

Once the first layer 10 and second layer 12 are aligned and placed in contact with each other, an ultrasonic head (horn) 22 is used to exert a pressure 24 against the second layer 12 and to hold the second layer 12 against the first layer 10 at an interface 26 between the two layers which is targeted for physical connection. A vacuum through one or more channels 28 through the ultrasonic horn 22 can be used to hold the second layer 12 in position.

Subsequently, an ultrasonic frequency applied at the interface 26 between the first layer 10 and the second layer 12 by the ultrasonic horn 22 results in an increased temperature of layers 10, 12 at the interface 26. The heat developed at the interface 26 can initially result from interfacial friction, which can become viscoeleastic heating as either the first layer 10, the second layer 12, or both, melt. The temperature reached at the interface 26 can be controlled, for example, by the pressure 24 applied at the interface 26 and the frequency and amplitude applied during bonding.

In an embodiment, layers 10, 12 include a polymer such as a polyimide or a thermoplastic, a metal such as stainless steel or aluminum, a heat-curable adhesive, a silicon layer, etc. Layers 10, 12 can be the same or different materials. In an embodiment, one of the layers 10, 12 is a polymer and the other of layers 10, 12 is a different material, where the polymer has a lower melting point than the different material. In this embodiment, the polymer can melt as a result of heat generated through ultrasonic bonding and, after terminating the ultrasonic process, the polymer cools to result in a physical attachment (bond) of the two layers 10, 12 together.

The pressure 24 exerted by the ultrasonic horn 22 can result in pressure 24 being transferred to the interface 26 between the first layer 10 and the second layer 12. The targeted pressure will vary with the specific materials use for layers 10, 12. With materials having a higher melting point, the pressure, ultrasonic bonding process duration, or frequency amplitude (or any combination thereof) of the ultrasonic bonding process can be increased to result in a higher heat of friction at the interface 26.

In an embodiment, one of the layers 10, 12 can be a stainless steel layer while the other of layers 10, 12 is a synthetic material such as a polymer. In an embodiment, a surface of the stainless steel can be treated to enhance bonding with the polymer. For example, a smooth stainless steel surface can be abraded or roughened using a chemical or mechanical etch to increase the surface area and surface roughness to provide an improved bond with the polymer layer, and/or to result in a higher heat of friction during an otherwise equivalent ultrasonic process which uses a layer having a smoother surface.

Figure 2:
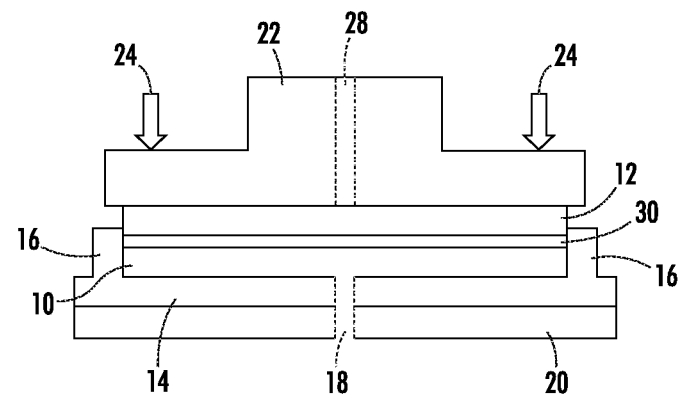
FIG. 2 is a cross section depicting ultrasonic bonding of two layers in accordance with another embodiment of the present teachings.

FIG. 2 depicts another embodiment which includes a heat-flowable adhesive layer 30 interposed between and contacting an underlying layer 10 and an overlying layer 12. In this embodiment, heat-flowable adhesive layer 30 can be a layer having a lower melting point than either underlying layer 10 or overlying layer 12. During lamination of the underlying layer 10 to the overlying layer 12, heat generated through interfacial friction and/or viscoelastic heating melts at least the flowable adhesive layer 30. The heating can also melt one, both, or neither of the underlying layer 10 and the overlying layer 12. After terminating the ultrasonic bonding process, the adhesive layer 30 cools (cures) to physically adhere underlying layer 10 to overlying layer 12. In an embodiment, heat-flowable layer 30 can be a metal such as titanium, chromium, or aluminum, and can be deposited using physical vapor deposition (PVD) or chemical vapor deposition (CVD). Heat-flowable adhesive layer 30 can also be, for example, a thermoplastic polyimide such as DuPont™ ELJ. In an embodiment, heat-flowable layer 30 can bond with carbon and oxygen groups in a thermoplastic layer to form Ti—O—C bonds. The heat-flowable adhesive layer 30 can be used, for example, to bond a polyimide to another polyimide, or a polyimide layer to a metal layer using the ultrasonic lamination process described above. In an embodiment, both of layers 10, 12 can be materials having a high melting point, such as a metal, while heat-flowable adhesive layer 30 can be a material having a lower melting point, such as a polymer, for example a thermoplastic.

In another embodiment, layer 30 is an uncured heat-curable layer which is interposed between layer 10 and layer 12. Ultrasonic bonding as described above is used to heat and cure layer 30 such that layer 10 and layer 12 are physically bonded by cured layer 30. In this embodiment, layer 30 can be, for example, a thermosetting polymer.

In the FIG. 2 embodiments, neither layer 10 nor layer 12 is required to be a heat-flowable layer or a heat-curable layer, and thus these embodiments may allow a wider variety of materials to be selected for layer 10 and layer 12.

The target temperature generated during ultrasonic bonding between layer 10 and layer 12 depends on the melting temperature or curing temperature required to physically attach layer 10 to layer 12.

To facilitate ultrasonic bonding, a surface of a layer such as a polyimide film, for example Upilexe® available from Ube Industries or DuPont™ Kapton® used for any or all of layers 10, 12, 30 can be treated using various techniques to convert the surface to a thermoplastic, which can then be melted during ultrasonic bonding and used to adhere the polyimide film with another layer. For example, a polyimide film can be treated with an aqueous base solution, for example potassium hydroxide (KOH) or exposed to a plasma treatment to convert the inert polyimide film to polyamic acid to result in a thermoplastic surface. The polyimide surface which has been converted to thermoplastic may have a lower melting point than the original polyimide surface, and thus this converted surface is better suited for ultrasonic bonding at a lower temperature than the untreated polyimide surface.

Various other embodiments of the present teachings are also contemplated. For example, several printhead layers forming the microfluidic channels (ink ports) require precision alignment, which can be difficult to achieve initially and more difficult to maintain as the aligned layers are placed into a stack press. Lateral forces exerted on aligned layers during the addition of stack press compliant pads and release liners on top of the parts to be bonded can cause a shift in the registration of the layers being bonded. Once the pads and release liners have been placed, the layers to be bonded are now hidden and misalignment caused by placement of the pads and release liners is difficult to detect. Additionally non-uniform pressure as the press plates descend upon the parts to be bonded can cause a shift in alignment, even though the parts may be gimbaled. Misalignment of the parts due to these factors can be reduced or eliminated if the parts are aligned and then temporarily tacked together using an ultrasonic bonding process described above to provide a weak temporary physical attachment prior to placing the assembly into the stack press or oven for the full cure. In this embodiment, the weak ultrasonic bond does not provide a fluid-tight seal, but holds the layers in position while a conventional adhesive is being cured in a stack press or oven. The conventional adhesive can be precisely placed between the first layer 10 and the second layer 12 prior to tacking the two layers together using ultrasonic lamination. After tacking, the underlying layer 10 and the overlying layer 12 can be placed in a stack press or oven (collectively, a "curing fixture") to cure the conventional adhesive to provide a fluid-tight seal provided between various layers by the conventional adhesive.

Figure 3:
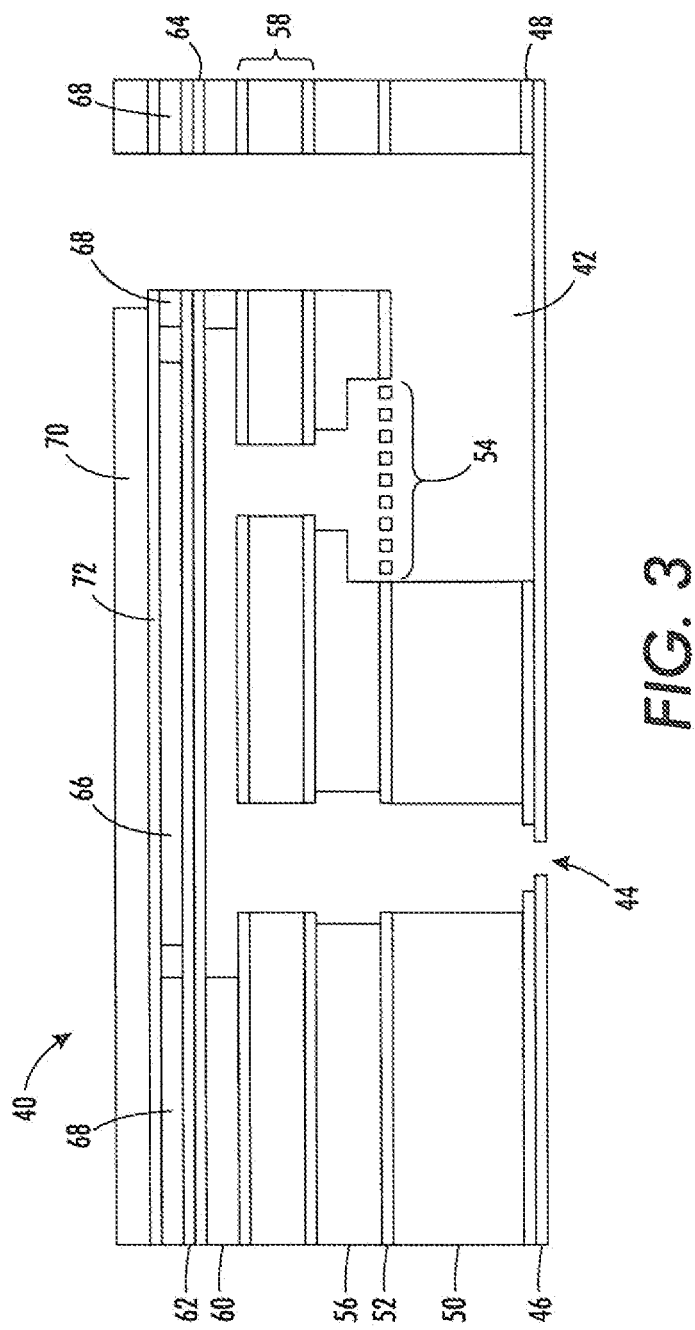
FIG. 3 is a cross section depicting a portion of a printhead which can be formed using one or more embodiments of the present teachings.

FIG. 3 depicts a printer subassembly, and more particularly part of an ink jet printhead 40, which can be formed using one or more embodiments of the present teachings to ultrasonically bond two or more layers together using an ultrasonically bonded layer. It will be understood that a printhead design can vary from the example depicted in FIG. 3. FIG. 3 generally depicts a single ink port 42 for the passage of ink to an aperture (nozzle) 44 within an aperture plate 46. An aperture plate adhesive 48 connects the aperture plate 46 to an inlet/outlet plate or manifold 50. A rock screen layer 52 including a rock screen (filter) 54 is interposed between the manifold 50 and a separator 56. FIG. 3 further depicts a vertical inlet 58 which can include a plurality of layers, a body plate 60, a diaphragm 62 attached to the body plate 60 with a diaphragm attach adhesive 64, piezoelectric actuator 66, a standoff layer 68, and a circuit layer 70 attached to the standoff layer 68 and the piezoelectric actuator 66 with an adhesive layer 72. A printhead structure can have hundreds or thousands of ink ports 42 and nozzles 44 within the aperture plate 46. It will be understood that two or more printhead layers can be physically attached to each other using an embodiment of the present teachings. For example, two layers can be physically connected without the use of a separate adhesive, for example using a process according to the FIG. 1 embodiment. In another embodiment, a separate adhesive layer can be formed by an embodiment of the ultrasonic bonding process as described with reference to, for example, FIG. 2. Other variations are contemplated.

Figure 4:
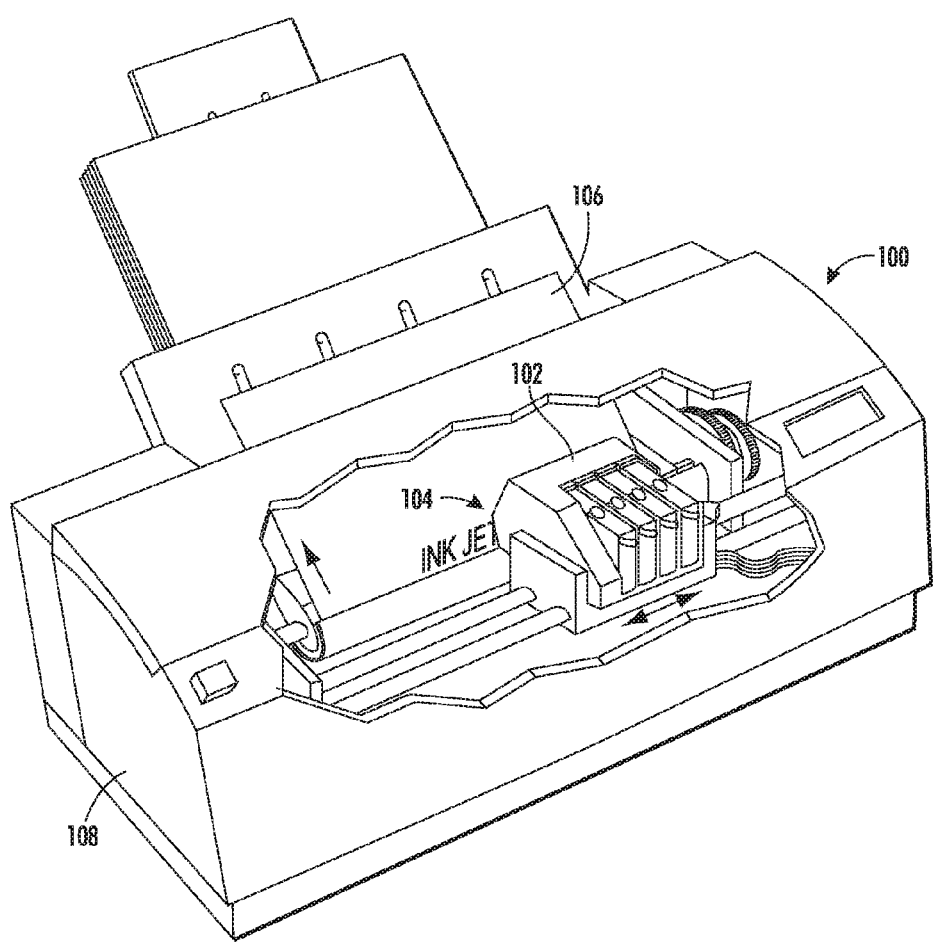
FIG. 4 is a is perspective view of a printer which can include a printhead formed in accordance with the present teachings.

Once manufacture of the printhead is completed, one or more printheads according to the present teachings can be installed in a printer. FIG. 4 depicts a printer 100 including one or more printheads 102 and ink 104 being ejected from one or more nozzles 44 in accordance with an embodiment of the present teachings. Each printhead 102 is configured to operate in accordance with digital instructions to create a desired image on a print medium 106 such as a paper sheet, plastic, etc. Each printhead 102 may move back and forth relative to the print medium 106 in a scanning motion to generate the printed image swath by swath. Alternately, the printhead 102 may be held fixed and the print medium 106 moved relative to it, creating an image as wide as the printhead 102 in a single pass. The printhead 102 can be narrower than, or as wide as, the print medium 106. The printer hardware including the printhead 102 can be enclosed in a printer housing 108. In another embodiment, the printhead 102 can print to an intermediate surface such as a rotating drum or belt (not depicted for simplicity) for subsequent transfer to a print medium.

Thus various embodiments of the present teachings can provide a fluid-tight seal for an ink jet printhead using an ultrasonic bonding process which has a reduced processing time compared to some heat cure processes. In contrast to an adhesive cure within a curing fixture, which can require two hours or more, ultrasonic bonding can require less than one minute, for example about 30 seconds. Additionally, the ultrasonic energy (bonding heat) can be localized at an interface between two layers to be connected together rather than heating all structures of the printhead, and thus the process of the present teachings can be less damaging to other structures such as silicon-based structures located either above or below the layers to be bonded. Further, some embodiments do not require dispensing an adhesive and thus the number of required materials and problems caused by adhesive flowing into undesired locations can be reduced. Additionally, the ultrasonic bonding techniques described herein can be used to connect a wider variety of materials, for example materials which cannot be reliably attached using conventional adhesives.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side" (as in "sidewall"), "higher," "lower," "over," "top," and "under" are defined with respect to the conventional plane or working surface being on the top surface of the workpiece, regardless of the orientation of the workpiece.

The invention claimed is:

1. A method for forming an ink jet printhead, comprising:
placing a first layer in contact with a second layer;
using an ultrasonic horn to exert pressure against the second layer to hold the second layer against the first layer at an interface between the first layer and the second layer;
applying an ultrasonic frequency at the interface between the first layer and the second layer with the ultrasonic horn; and
curing at least one of the first layer and the second layer to physically attach the first layer to the second layer and to form at least a portion of an ink jet printhead.

2. The method of claim 1, further comprising:
melting at least one of the first layer and the second layer during the application of the ultrasonic frequency; and
cooling the melted at least one of the first layer and the second layer to cure the at least one of the first layer and the second layer to physically attach the first layer to the second layer.

3. The method of claim 1 wherein the first layer is a heat-flowable layer, the second layer is an overlying layer which overlies the heat-flowable layer, and the method further comprises:
placing an underlying layer in contact with the heat-flowable layer such that the heat-flowable layer is interposed between and contacts the underlying layer and the overlying layer;
heating the heat-flowable layer during the application of the ultrasonic frequency at the interface between the heat-flowable layer and the overlying layer; and
cooling the heat-flowable layer to cure the heat-flo able layer to physically attach the underlying layer to the overlying layer with the heat-flowable layer.

4. The method of claim 1 wherein the first layer is a heat-curable layer, the second layer is an overlying layer which overlies the heat-curable layer, and the method further comprises:
placing an underlying layer in contact with the heat-curable layer such that the heat-curable layer interposed between and contacts the underlying layer and the overlying layer; and
heating the heat-curable layer during the application of the ultrasonic frequency at the interface between the heat-curable layer and the overlying layer to physically attach the underlying layer to the overlying layer with the heat-curable layer.

5. The method of claim 1, wherein the first layer is a polyimide film and the method further comprises:

treating a surface of the polyimide film to convert the surface to a thermoplastic;

physically contacting the second layer and the thermoplastic surface;

heating and melting the thermoplastic surface during the application of the ultrasonic frequency at the interface between the thermoplastic surface and the second layer; and cooling the thermoplastic surface to cure the thermoplastic surface to physically attach the polyimide film to the second layer using the thermoplastic surface.

6. The method of claim 1, further comprising:

providing a fluid-tight seal between the first layer and the second layer using the cured at least one of the first layer and the second layer.

7. The method of claim 1, further comprising:

placing an adhesive between the first layer and the second layer;

temporarily bonding the first layer to the second layer while applying the ultrasonic frequency at the interface between the first layer and the second layer;

subsequent to temporarily bonding the first layer to the second layer, placing the first layer and the second layer into a curing fixture; and curing the adhesive within the curing fixture, wherein a fluid-tight seal is provided between the first layer and the second layer using the cured adhesive.

\* \* \* \* \*